(12) United States Patent
Huang et al.

(10) Patent No.: US 11,502,471 B2
(45) Date of Patent: Nov. 15, 2022

(54) PRESS CUTTING TOOL

(71) Applicant: Hanlong Industrial Co., Ltd., New Taipei (TW)

(72) Inventors: Chien-Wei Huang, New Taipei (TW); Mei-Fang Lin, New Taipei (TW)

(73) Assignee: Hanlong Industrial Co., Ltd., New Taipei (TW)

(*) Notice: Subject to any disclaimer, the term of this patent is extended or adjusted under 35 U.S.C. 154(b) by 331 days.

(21) Appl. No.: 16/878,710

(22) Filed: May 20, 2020

(65) Prior Publication Data

US 2021/0226398 A1 Jul. 22, 2021

(30) Foreign Application Priority Data

Jan. 21, 2020 (TW) .................................. 109102244

(51) Int. Cl.
*H01R 43/042* (2006.01)
*B25B 7/12* (2006.01)
*B25B 7/06* (2006.01)

(52) U.S. Cl.
CPC ........... *H01R 43/0421* (2013.01); *B25B 7/06* (2013.01); *B25B 7/12* (2013.01)

(58) Field of Classification Search
CPC .... B25B 7/12; B25B 7/06; B25B 7/22; H02G 1/1212; H02G 1/1209; H02G 1/1207; H01R 43/042
See application file for complete search history.

(56) References Cited

U.S. PATENT DOCUMENTS

2014/0020513 A1* 1/2014 Yen ...................... H02G 1/1212
81/9.41
2016/0105006 A1* 4/2016 Landes ................ H02G 1/1297
30/91.2

FOREIGN PATENT DOCUMENTS

EP 1174969 A1 * 1/2002 ........... H02G 1/1212

OTHER PUBLICATIONS

Translation of EP1174969A1, retrieved from Espacenet on Aug. 26, 2022 (Year: 2002).*

* cited by examiner

*Primary Examiner* — Orlando E Aviles
*Assistant Examiner* — Thomas Raymond Rodgers
(74) *Attorney, Agent, or Firm* — Alan D. Kamrath; Karin L. Williams; Mayer & Williams PC (57) ABSTRACT

A press cutting tool is disclosed. The press cutting tool includes a first and second plier, a first and second connecting rod, an opening, a pressing block, and a cutting block. The first and second connecting rods are connected to the second plier. The opening is used for placing a connection head. The pressing block is connected to the first connecting rod for clamping housing. The cutting block is connected to the second connecting rod for cutting the connection line; wherein the pressing block and the cutting block slide separately, and an initial distance from the pressing block to the opening is greater than an initial distance from the cutting block to the opening. After the first and second plier are pressed, the pressing block slides first to clamp and press the housing, and then the cutting block slides to cut the connection line.

11 Claims, 12 Drawing Sheets

PRESS CUTTING TOOL

BACKGROUND

1. Field of the Invention

The present invention relates to a press cutting tool, particularly to a press cutting tool which can make a connection head difficult to shake.

2. Description of the Related Art

Nowadays, many different kinds of press cutting tools have been developed to install different sizes of connectors or ports. Hereafter, please first refer to FIG. 1 for an external view of a connection head of the prior art.

Figure 1:
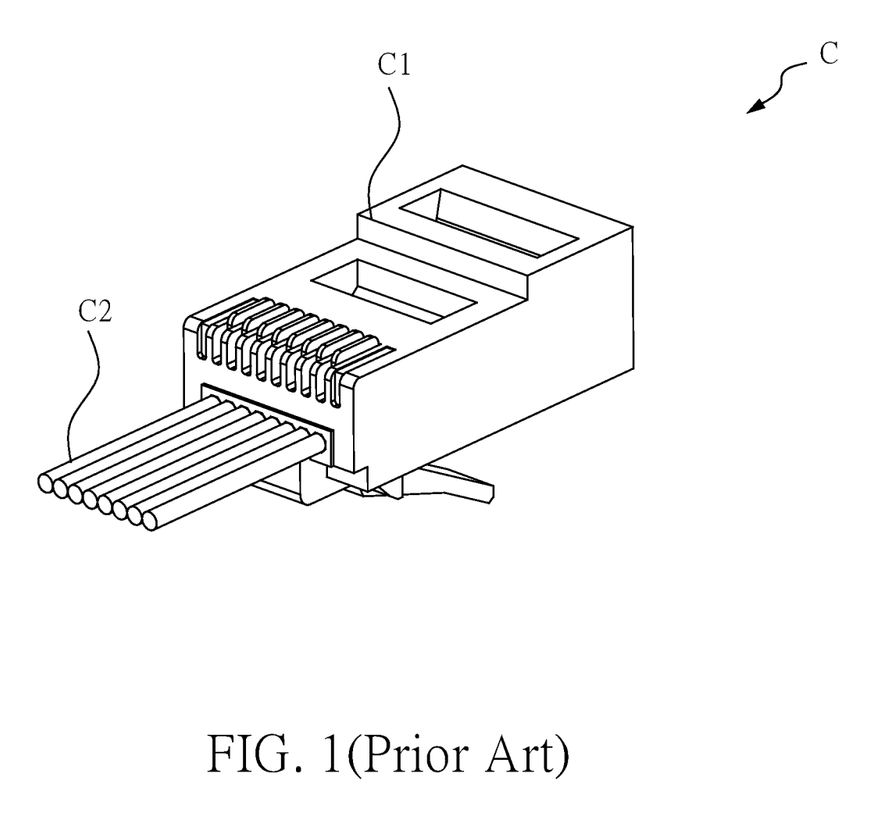
FIG. 1 is an external view of a connection head of the prior art.

In the prior art, a connection head C with a specification of EZ-RJ45™ has been developed. Such connection head C has a simple one-piece design, and thus a technical staff can easily slide the connection line C2 into the housing C1, then pull it out from the front of the housing C1, and finally cut off the connection line C2 that goes out of the housing C1. Therefore, it is easy to visually confirm the wiring layout of the connection line C2 before pressing the housing C1.

Figures 2A, 2B:
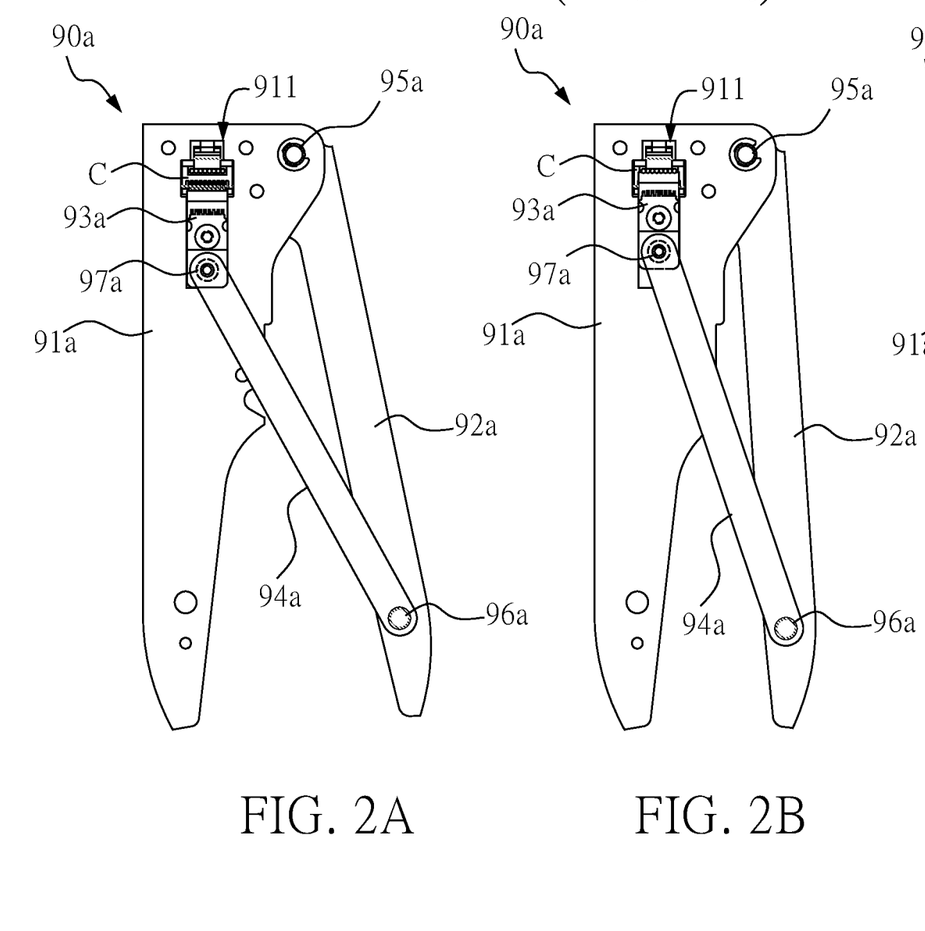
FIGS. 2A-2C are schematic diagrams showing the operation of a press cutting tool of a first embodiment of the prior art.
Figure 2C:
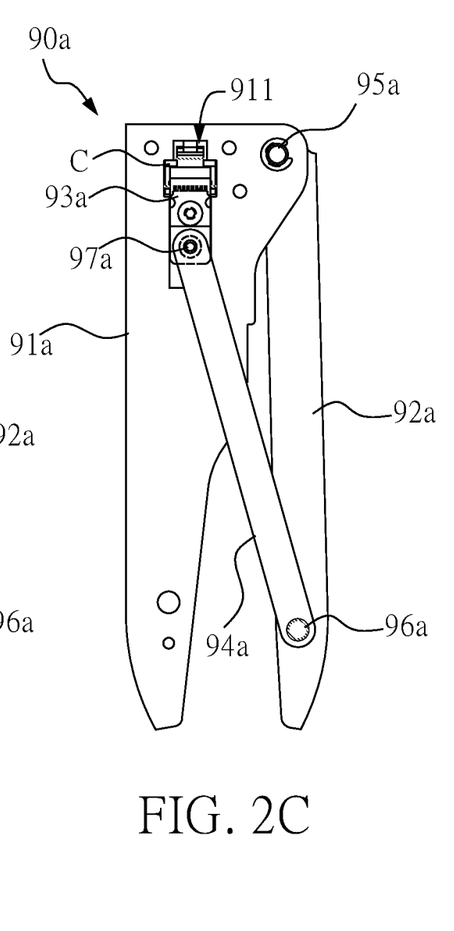

The method of operating the connection head C can be shown in FIGS. 2A-2C. FIGS. 2A-2C are schematic diagrams showing the operation of the press cutting tool of a first embodiment of the prior art.

A press cutting tool 90a of a first embodiment of the prior art includes a first plier 91a, a second plier 92a, a crimping section 93a, a connecting rod 94a, a first pivot joint 95a, a second pivot joint 96a, and a third pivot joint 97a. The first plier 91 includes an opening 911, and the crimping section 93a is located next to the opening 911. Also, the first plier 91 is pivotally connected to the second plier 92a by the first pivot joint 95a at the end. The second plier 92a is connected to one end of the connecting rod 94 by the second pivot joint 96a, and the opposite end of the connecting rod 94a is connected to the crimping section 93a by the third pivot joint 97a. The opening 911 can be placed with a connection head C. The crimping section 93a includes a blade. As such, when the first plier 91a and the second plier 92a are pressed, that is, from the state of FIG. 2A to FIG. 2B, the crimping section 93a will move due to the connection of the first plier 91a, the second plier 92a, and the connecting rod 94a. From the state of FIG. 2B to FIG. 2C, the crimping section 93a will continue to move, such that the housing C1 is pressed and the connection line C2 is cut off.

Figure 3A:
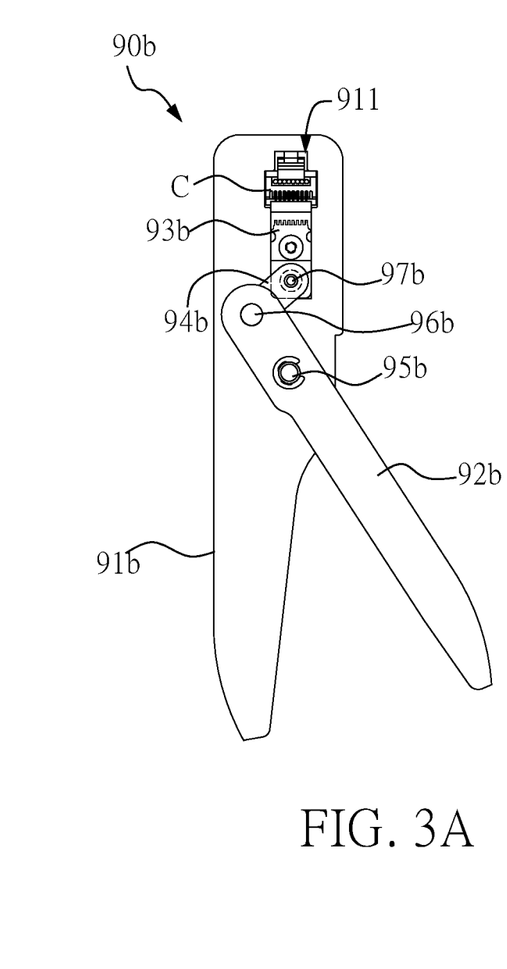
FIGS. 3A-3C are schematic diagrams showing the operation of a press cutting tool of a second embodiment of the prior art.
Figure 3B:
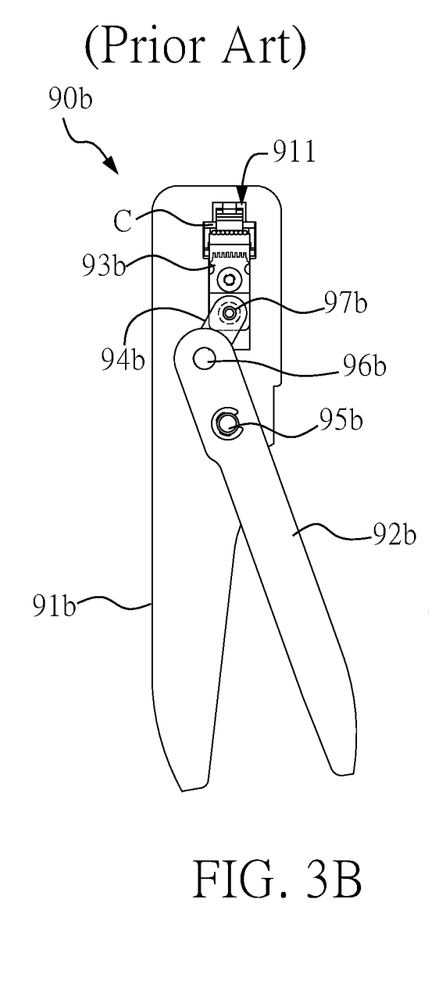
Figure 3C:
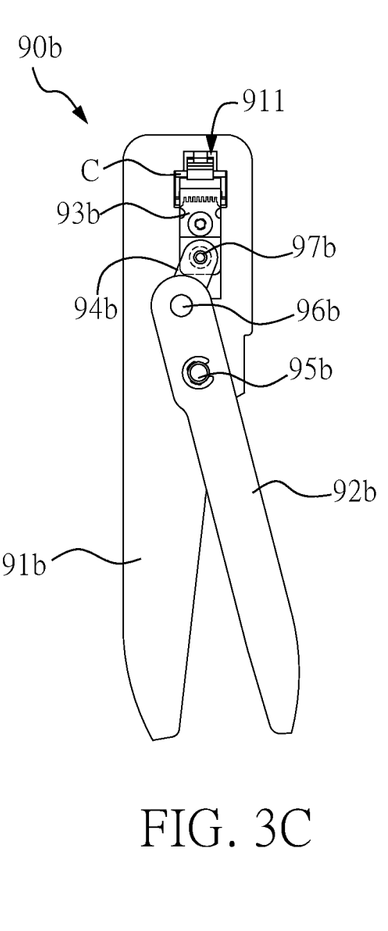

Please then refer to FIGS. 3A-3C, which are schematic diagrams showing the operation of a press cutting tool of a second embodiment of the prior art.

The press cutting tool 90b of the second embodiment of the prior art includes a first plier 91b, a second plier 92b, a crimping section 93b, a connecting rod 94b, a first pivot joint 95b, a second pivot joint 96b, and a third pivot joint 97b. The first plier 91 has an opening 911. The crimping section 93b is provided next to the opening 911. The first plier 91 is pivotally connected to the second plier 92b by the first pivot joint 95b in the middle. The second plier 92b is connected to an end of the connecting rod 94 by the second pivot joint 96b, and the opposite end of the connecting rod 94b is connected to the crimping section 93b by the third pivot joint 97b. The opening 911 can be placed with a connection head C. The crimping section 93b includes a blade. As such, when the first plier 91b and the second plier 92b are pressed, i.e. from the state of FIG. 3A to FIG. 3B, crimping section 93b will move due to the moving of the first plier 91b, the second plier 92b and the connecting rod 94b. From the state of FIG. 3B to FIG. 3C, the crimping section 93b will continue to move, such that the housing C1 is pressed while the connection line C2 is cut off.

However, the press cutting tool 90a or 90b in the prior art presses the housing C1 of the connection head C and cuts the connection line C2 at the same time. Therefore, if the press cutting tool 90a or 90b shakes slightly, the cutting of connection line C2 is not flat enough. This will cause the production of defective products. Accordingly, it is necessary to devise a new press cutting tool to solve the problem in the prior art.

SUMMARY OF THE DISCLOSURE

It is a major objective of the present invention to provide a press cutting tool having the effect of making the connection head difficult to shake.

To achieve the above objective, the press cutting tool of the present invention is used to cut a connection head. The connection head includes a connection line and a housing. The press cutting tool includes a first plier, a second plier, a first connecting rod, a second connecting rod, an opening, a pressing block, and a cutting block. The second plier is pivotally connected to the first plier by the first pivoting portion. The first connecting rod is connected to the second plier. The second connecting rod is connected to the second plier. The opening is located on the first plier for placing the connection head. The pressing block is adjacent to the opening and connected to the first connecting rod for clamping the housing. cutting block is adjacent to the opening and connected to the second connecting rod for cutting the connection line; wherein the pressing block and the cutting block slide separately, and the initial distance from the pressing block to the opening is greater than the initial distance from the cutting block to the opening; wherein after the first plier and the second plier are pressed, the first connecting rod causes the pressing block to slide first to clamp and press the housing, and then the second connecting rod causes the cutting block to slide to cut the connection line.

DETAILED DESCRIPTION OF THE PREFERRED EMBODIMENTS

Hereafter, the technical content of the present invention will be better understood with reference to preferred embodiments.

Figure 4:
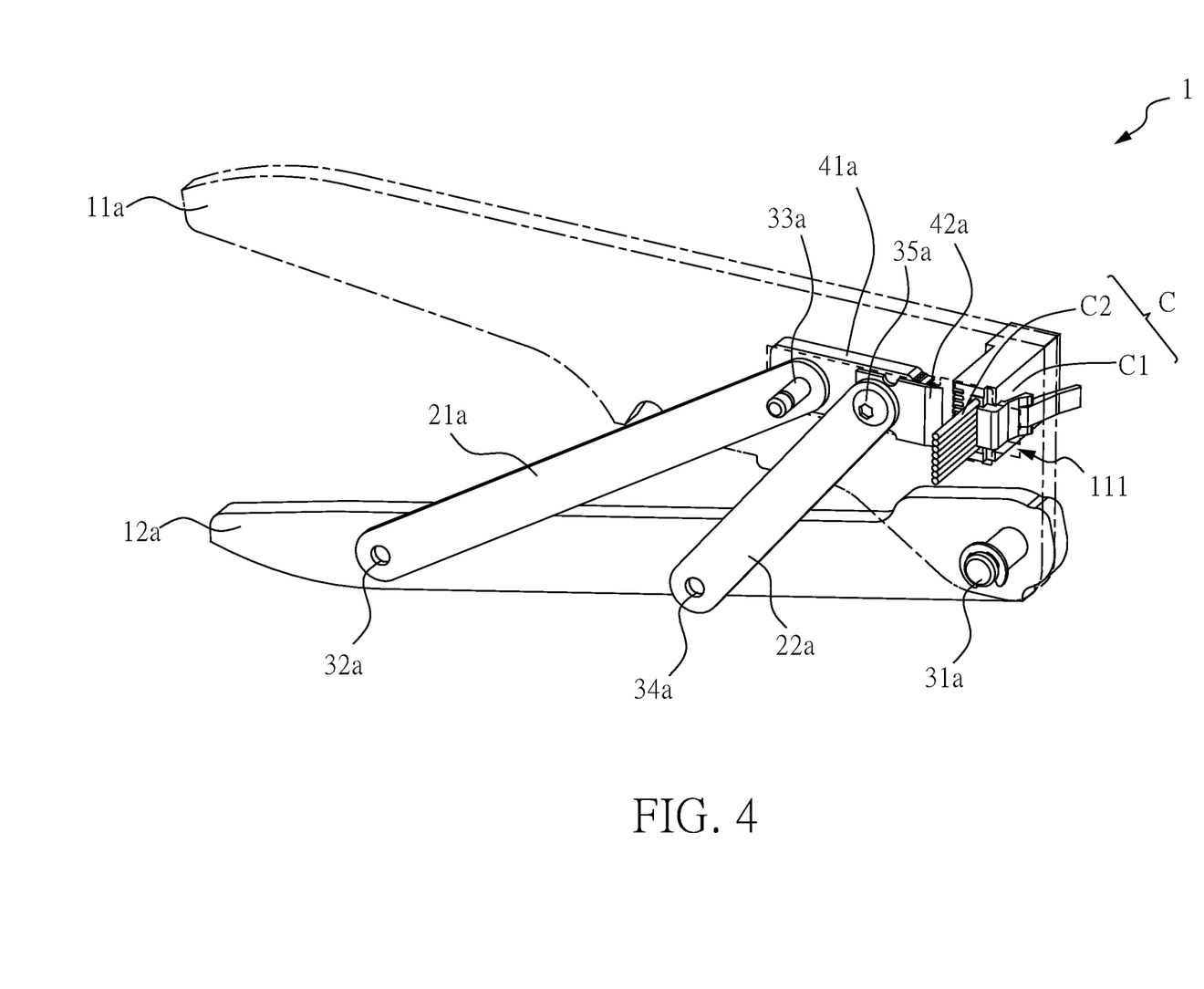
FIG. 4 is a perspective view of a press cutting tool of a first embodiment of the present invention.
Figure 5A:
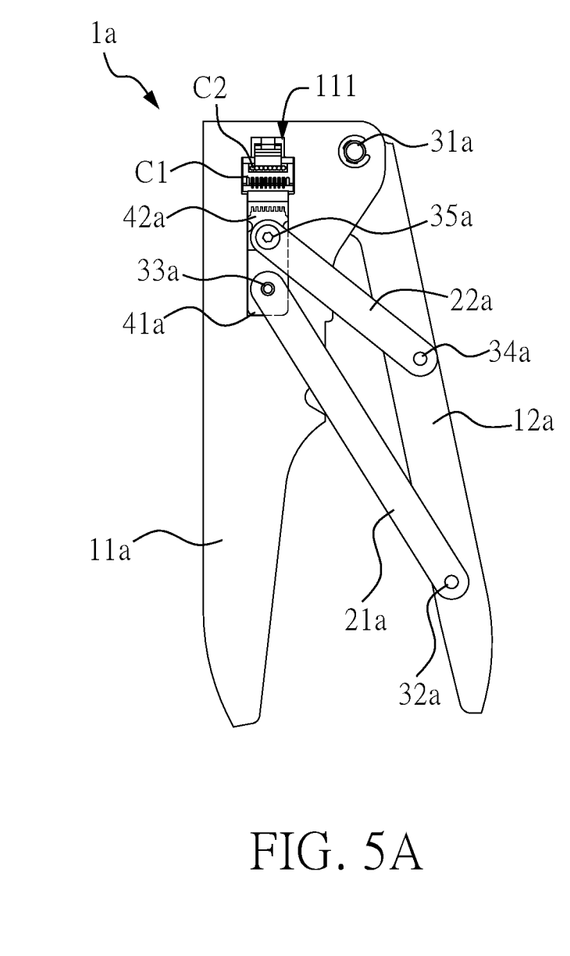
FIGS. 5A-5C are schematic diagrams showing the operation of the press cutting tool of the first embodiment of the present invention.
Figure 5B:
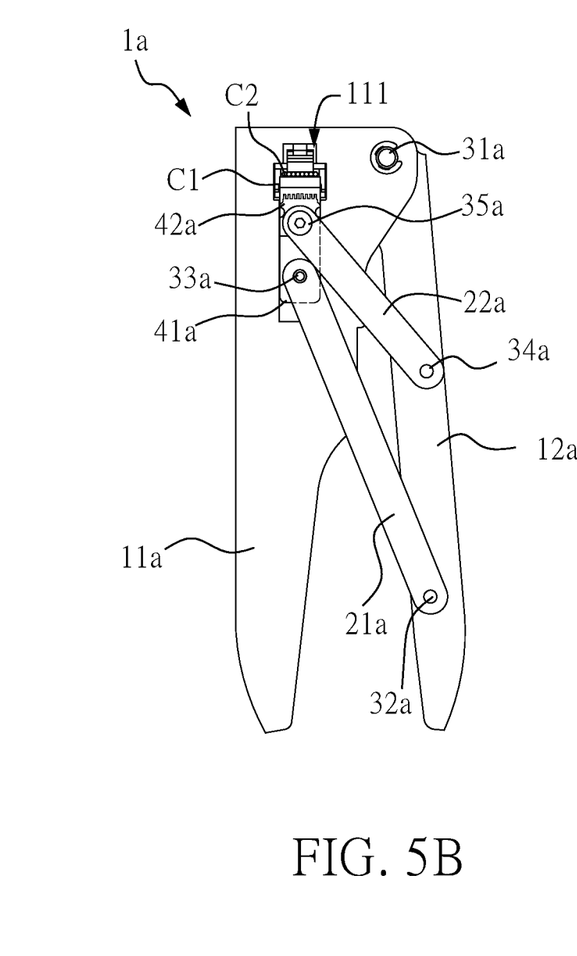
Figure 5C:
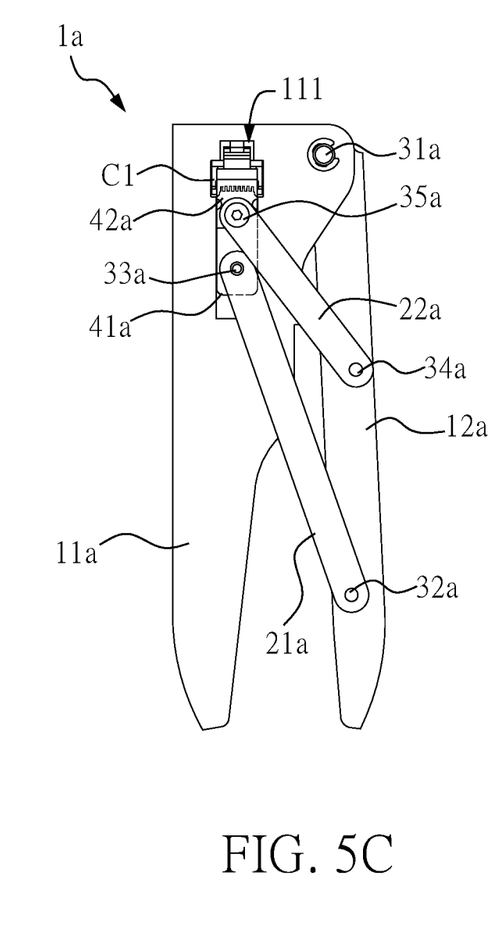

Hereafter, please first refer to FIG. 4 for a perspective view of a press cutting tool of a first embodiment of the present invention, and FIGS. 5A-5C about schematic diagrams showing the operation of the press cutting tool of the first embodiment of the present invention. It should be noted that although the following description uses the terms "first", "second", etc. to describe various elements, these elements should not be limited by these terms. These terms are only used to distinguish one element from another. For example, without departing from the scope of the various described embodiments, the first plier may be referred to as the second plier, and similarly, the second plier may be referred to as the first plier. The first plier and the second plier are both pliers, but they are not the same pliers.

In the first embodiment of the present invention, the press cutting tool 1a is used for cutting a connection head C. The connection head C includes a housing C1 and a connection line C2. Same as FIG. 1, the connection head C is the EZ-RJ45 connection head, and its structure will not be described here. The press cutting tool 1a includes a first plier 11a, a second plier 12a, a first connecting rod 21a, a second connecting rod 22a, an opening 111, a pressing block 41a, and a cutting block 42a. The first plier 11a is pivotally connected to the second plier 12a by the first pivoting portion 31a at the end, such that the first plier 11a and the second plier 12a can rotate with each other. The first connecting rod 21a is connected to the second plier 12a and then to the pressing block 41a. The second connecting rod 22a is connected to the second plier 12a, and then to the cutting block 42a.

The pressing block 41a and the cutting block 42a are adjacent to the opening 111. The opening 111 is located on the first plier 11a. The size of the opening 111 will match the size of the housing C1 of the connection head C for placing the connection head C. The specifications of pressing block 41a are in accordance with the specifications of housing C1 of connection head C, and are used for clamping and pressing the housing C1. The cutting block 42a is provided with a blade for cutting the connection line C2 protruding from the housing C1. The pressing block 41a is adjacent to the cutting block 42a, but they are not set on the same structure. Therefore, the pressing block 41a and the cutting block 42a slide separately, instead of moving together. In addition, the initial distance of the pressing block 41a to the opening 111 will be greater than the initial distance of the cutting block 42a to the opening 111. This design can increase the opening area as much as possible, making it easier for the connection head C to fit into the opening 111.

In the first embodiment of the present invention, the first connecting rod 21a includes a second pivoting portion 32a and a third pivoting portion 33a. The second connecting rod 22a includes a fourth pivoting portion 34a and a fifth pivoting portion 35a. The first connecting rod 21a is pivotally connected to the second plier 12a by the second pivoting portion 32a, and pivotally connected to the pressing block 41a by the third pivoting portion 33a. The second connecting rod 22a is pivotally connected to the second plier 12a by the fourth pivoting portion 34a, and pivotally connected to the cutting block 42a by the fifth pivoting portion 35a. Further, the distance between the second pivoting portion 32a and the first pivoting portion 31a is greater than the distance between the fourth pivoting portion 34a and the first pivoting portion 31a, and the length of the first connecting rod 21a is greater than the length of the second connecting rod 22a.

In the first embodiment of the present invention, when the first plier 11a and the second plier 12a are pressed, i.e. from the state of FIG. 5A to FIG. 5B, with the first connecting rod 21a, the pressing block 41a slides first to clamp and press the housing C1. At this time, the connection line C2 has not been cut off. When the first plier 11a and the second plier 12a continue to be pressed, i.e. from the state of FIG. 5B to FIG. 5C, the second connecting rod 22a causes the cutting block 42a to slide to cut the connection line C2.

Figure 6:
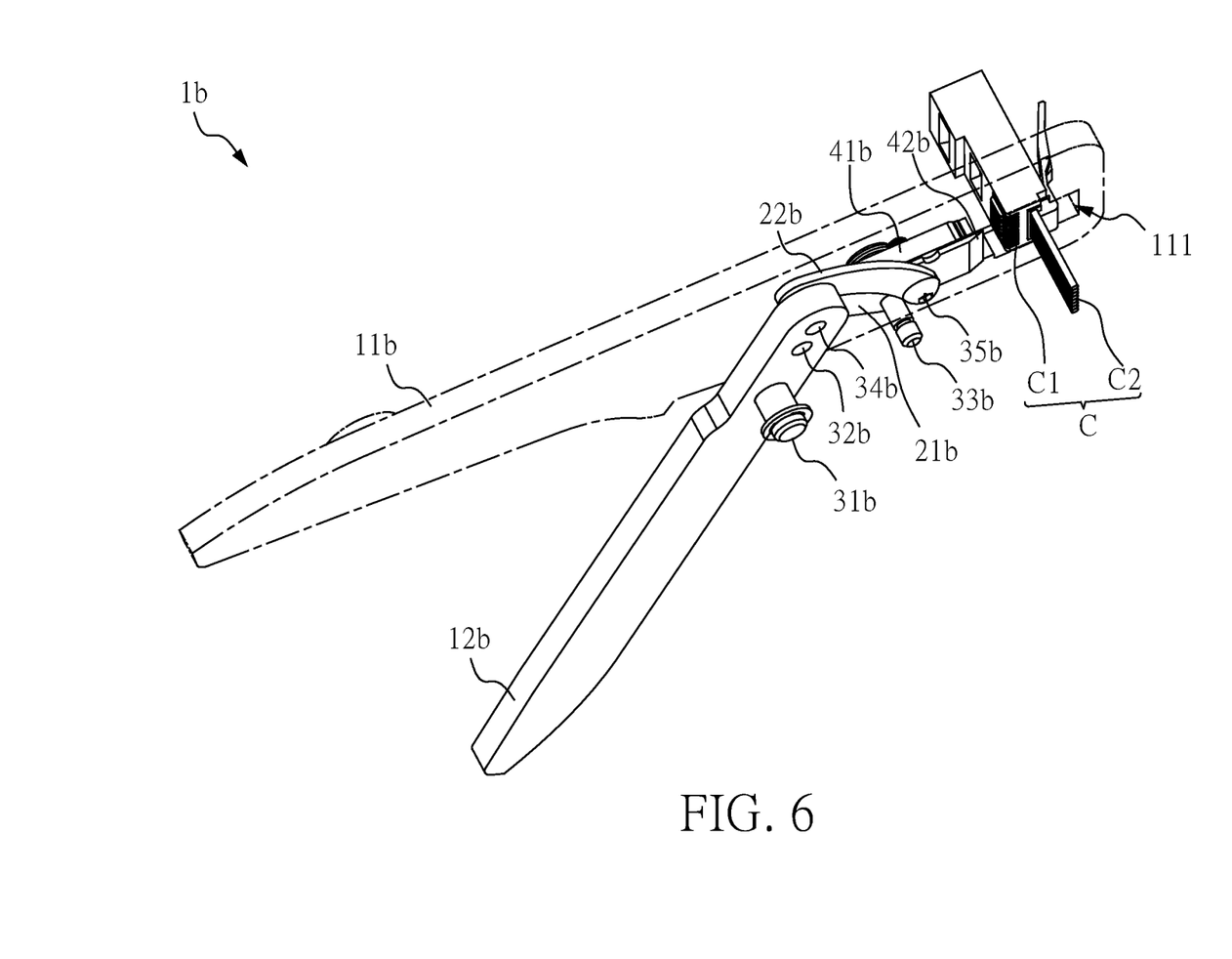
FIG. 6 is a perspective view of a press cutting tool of a second embodiment of the present invention.
Figure 7A:
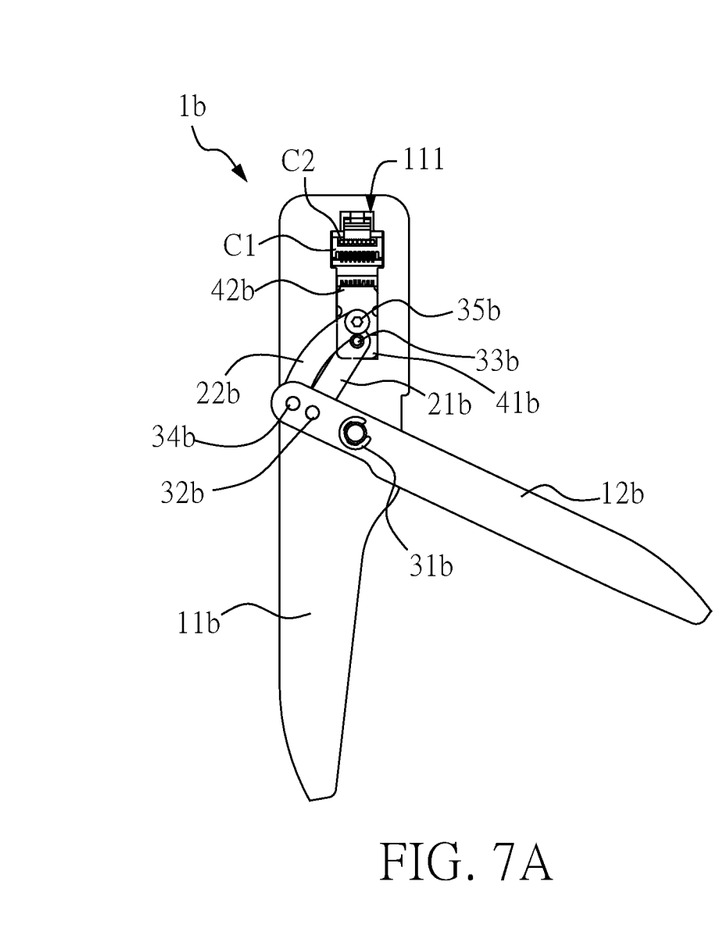
FIGS. 7A-7C are schematic diagrams showing the operation of the press cutting tool of the second embodiment of the present invention.
Figure 7B:
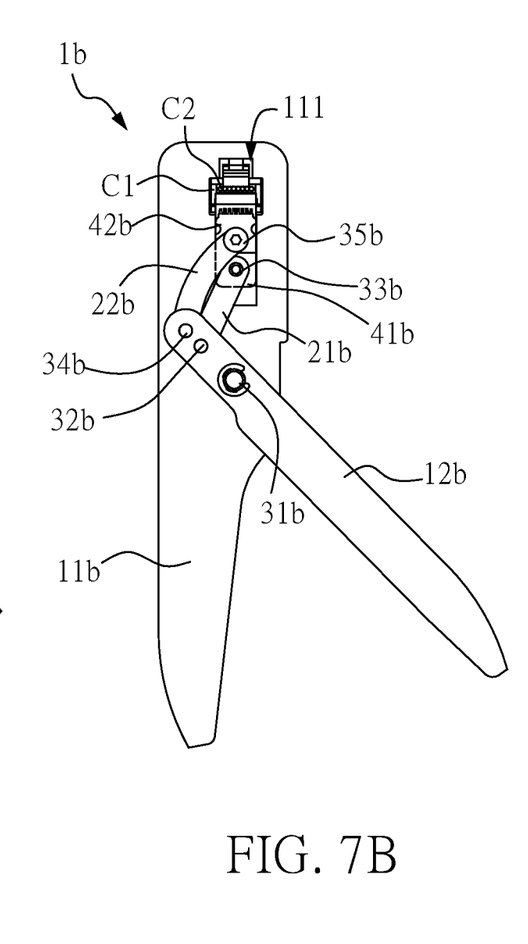
Figure 7C:
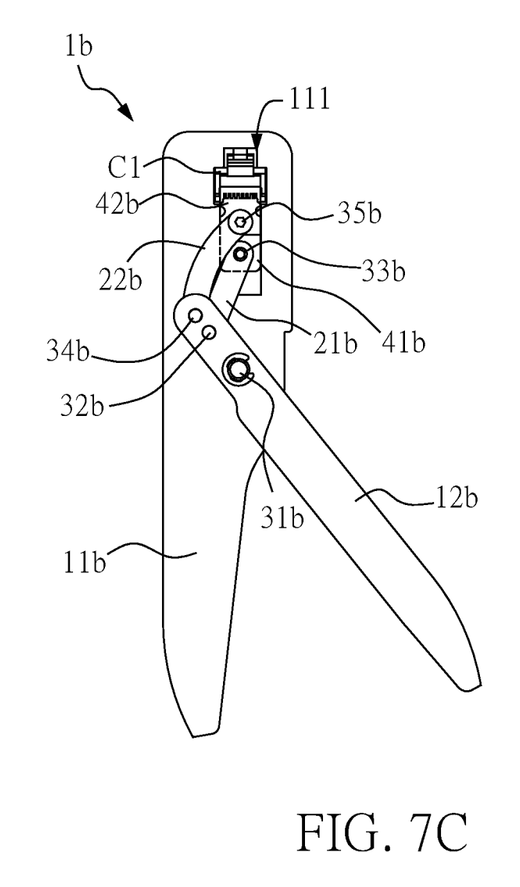

Please then refer to FIG. 6 for a perspective view of a press cutting tool of a second embodiment of the present invention, and FIGS. 7A-7C for schematic diagrams showing the operation of the press cutting tool of the second embodiment of the present invention.

In the second embodiment of the present invention, similarly, the press cutting tool 1b includes a first plier 11b, a second plier 12b, a first connecting rod 21b, a second connecting rod 22b, an opening 111, a pressing block 41b and a cutting block 42b. The first plier 11b is pivotally connected to the second plier 12b by the first pivoting portion 31b in the middle, such that the first plier 11b and the second plier 12b can rotate with each other. The first connecting rod 21b is pivotally connected to the second plier 12b by the second pivoting portion 32b, and pivotally connected to the pressing block 41b by the third pivoting portion 33b. Besides, the second connecting rod 22b is pivotally connected to the second plier 12b by the fourth pivoting portion 34b, and pivotally connected to the cutting block 42b by the fifth pivoting portion 35b.

In the second embodiment, the distance between the second pivoting portion 32b and the first pivoting portion 31b is less than the distance between the fourth pivoting portion 34b and the first pivoting portion 31b, Further, the second connecting rod 22b has a curved shape. Therefore, in the second embodiment of the present invention, after the first plier 11b and the second plier 12b are pressed, i.e. from the state of FIG. 7A to FIG. 7B, the first connecting rod 21b causes the pressing block 41b to first slide to clamp and press the housing C1. At this time, the connection line C2 has not been cut off. When the first plier 11b and the second plier 12b continue to be pressed, i.e. from the state of FIG. 7B to FIG. 7C, the second connecting rod 22b causes the cutting block 42b to slide to cut the connection line C2.

Figure 8:
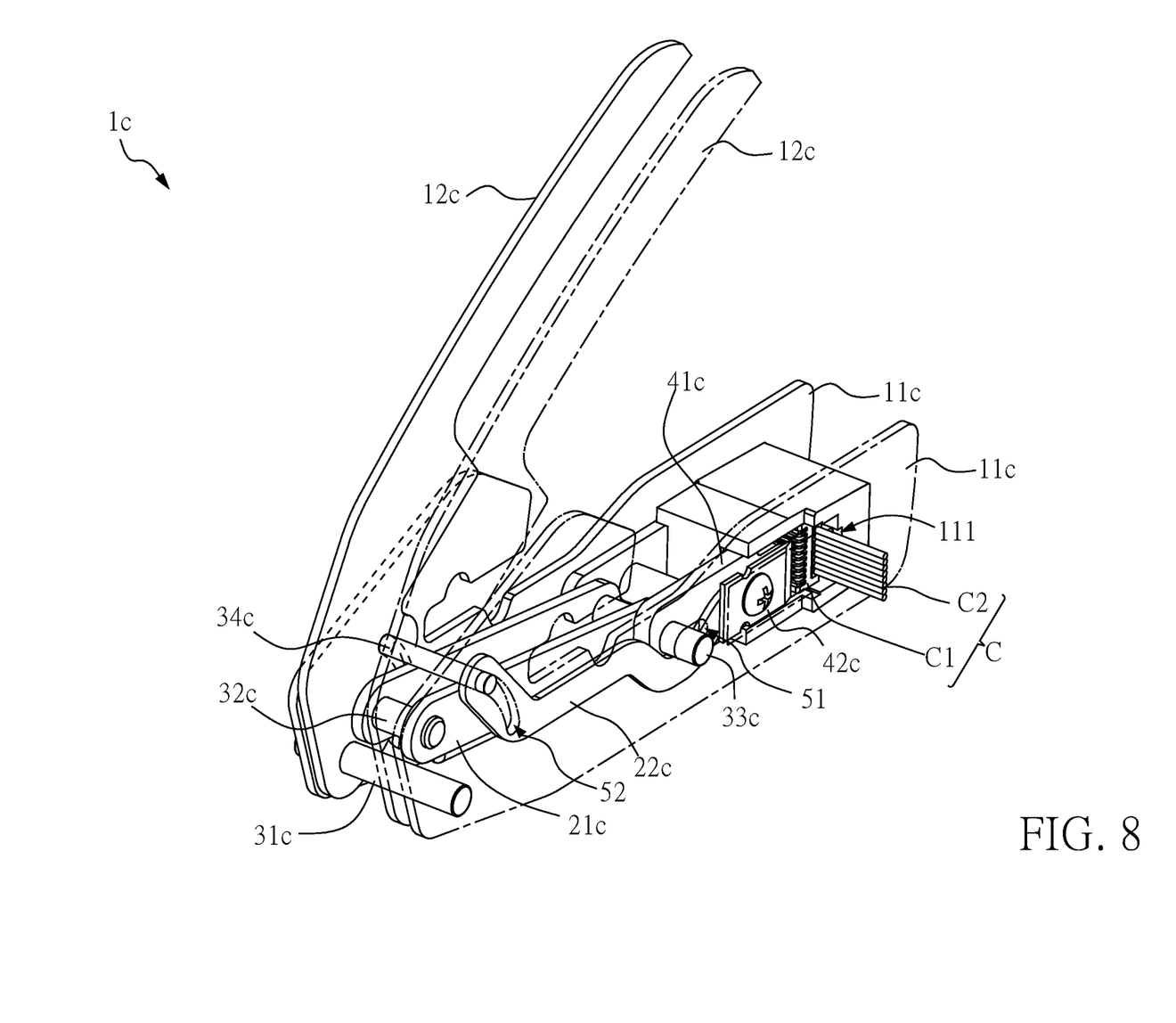
FIG. 8 is a perspective view of a press cutting tool of a third embodiment of the present invention.
Figure 9A:
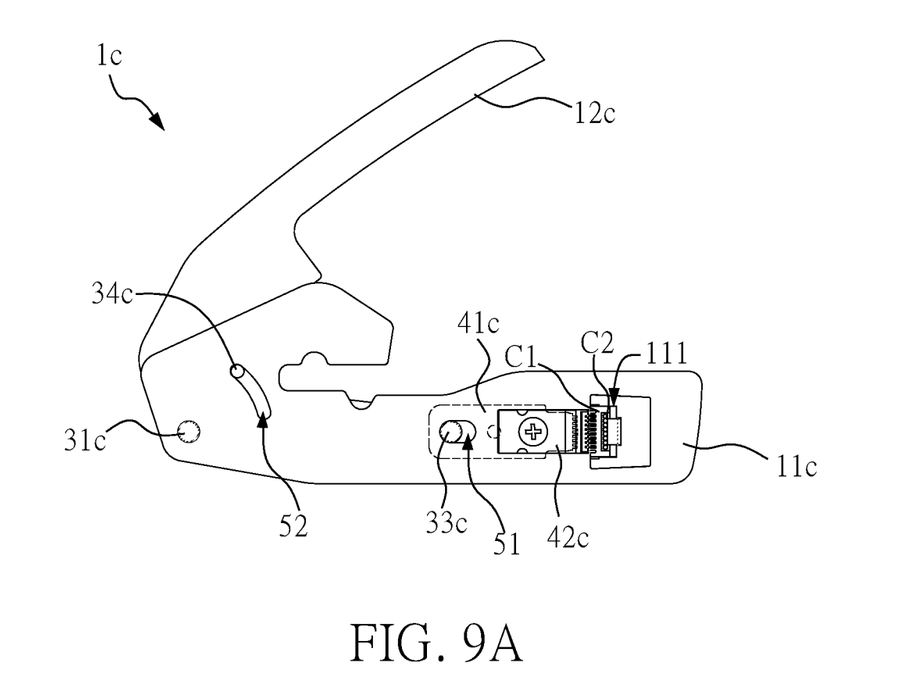
FIGS. 9A-9C are schematic diagrams showing the operation of the press cutting tool of the third embodiment of the present invention.
Figure 9B:
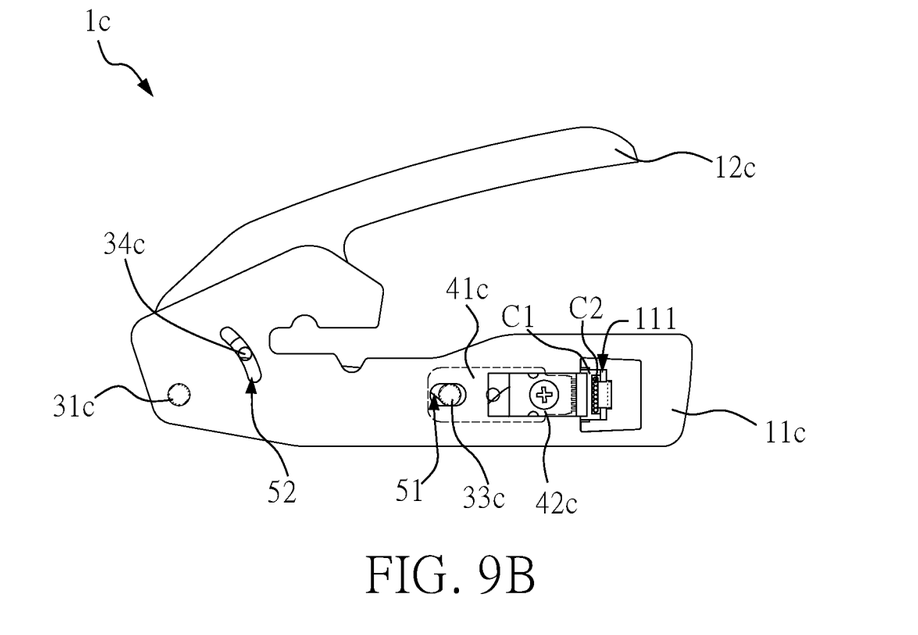
Figure 9C:
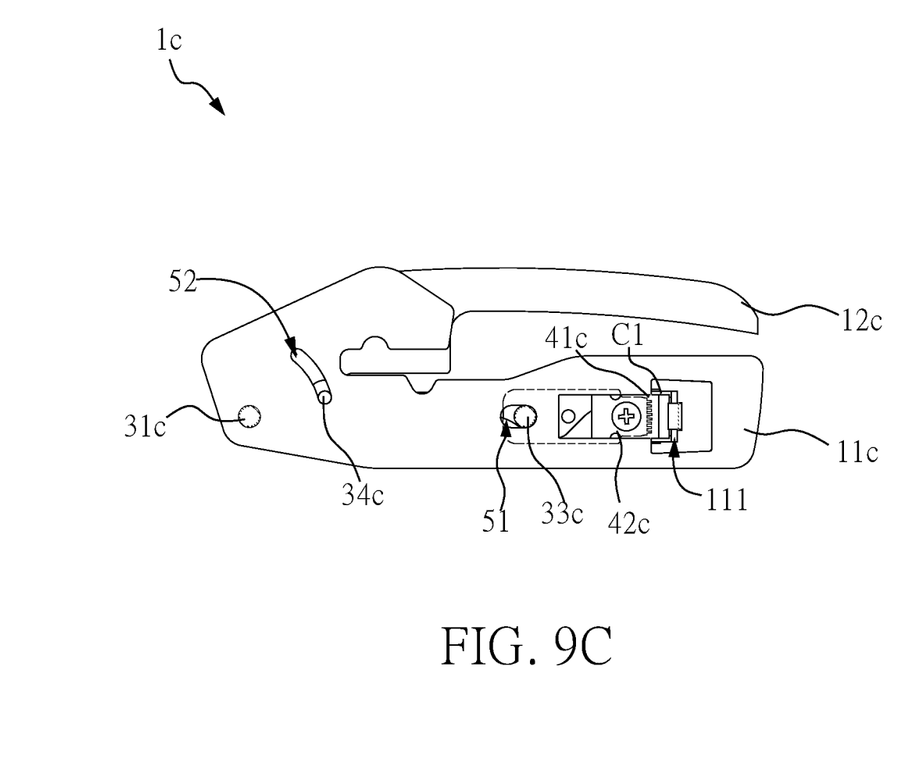

Please then refer to FIG. 8 for a perspective view of a press cutting tool of a third embodiment of the present invention, and FIGS. 9A-9C for schematic diagrams showing the operation of the press cutting tool of the third embodiment of the present invention.

In the third embodiment of the present invention, similarly, the press cutting tool 1c includes a first plier 11c, a second plier 12c, a first connecting rod 21c, a second connecting rod 22c, an opening 111, a pressing block 41c and a cutting block 42c. The first plier 11c is provided outside the second plier 12c. Moreover, the first plier 11c is pivotally connected to the second plier 12c by the first pivoting portion 31c at the end, such that the first plier 11c and the second plier 12c can rotate with each other. The first connecting rod 21c is pivotally connected to the second plier 12c by the second pivoting portion 32c, and pivotally connected to the pressing block 41c by the third pivoting portion 33c. The second pivoting portion 32c is not connected to the first plier 11c, such that the second pivoting portion 32c can be moved by the rotation of the second plier 12c. The second connecting rod 22c is pivotally connected to the second plier 12c by the fourth pivoting portion 34c, and pivotally connected to the cutting block 42c by the fifth pivoting portion 35c.

In the third embodiment of the present invention, the first plier 11c further includes a first sliding hole 51 and a second sliding hole 52. The first sliding hole 51 allows the third pivoting portion 33c to slide therein, and the second sliding hole 52 allows the fourth pivoting portion 34c to slide therein. The shape of the second sliding hole 52 can be curved. With this, after the first plier 11c and the second plier 12c are pressed, i.e. from the state of FIG. 9A to FIG. 9B, the second pivoting portion 32c can be moved by the rotation of the second plier 12c, which in turn moves the first connecting rod 21c, such that the third pivoting portion 33c slides within the first sliding hole 51, and then causes the pressing block 41c to slide first to clamp and press the housing C1. At this time, the fourth pivoting portion 34c also slides within the second sliding hole 52 due to the rotation of the second plier 12c, such that the second connecting rod 22c can be rotated by the sliding of the fourth pivoting portion 34c within the second sliding hole 52.

After the first plier 11c and the second plier 12c are pressed to cause the pressing block 41c to slide, i.e. from the state of FIG. 9B to FIG. 9C, the fourth pivoting portion 34c will continue to move due to the rotation of the second plier 12c, which in turn pushes the second connecting rod 22c. This allows the cutting block 42c to slide to cut the connection line C2.

In addition to the above-mentioned mechanism elements, the press cutting tool 1a, 1b, 1c of the present invention may also include other mechanism elements. Since the technology of other mechanism elements is not the focus of the present invention, it will not be described here. In addition, the present invention is not limited to the implementation of the aforementioned press cutting tool 1a, 1b, 1c.

As described above, the press cutting tool 1a, 1b, 1c of the present invention can first fix the housing C1 and then cut the connection line C2 to reduce the probability of shaking the connection head C. Therefore, a better product quality can be obtained.

It should be noted that the embodiments of the present invention described above are only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. All without departing from the scope of the invention are defined solely by the appended claims

What is claimed is:

1. A press cutting tool, used for cutting a connection head, the connection head comprising a connection line and a housing, the press cutting tool comprising:
   a first plier;
   a second plier, which is pivotally connected to the first plier through a first pivoting portion;
   a first connecting rod, which is connected to the second plier;
   a second connecting rod, which is connected to the second plier;
   an opening, located on the first plier, for placing the connection head, the opening having a first axis;
   a pressing block, which is located on a first side of the opening and connected to the first connecting rod, for clamping the housing; and
   a cutting block, which is located on a second side of the opening and connected to the second connecting rod, for cutting the connection line;
   wherein the pressing block and the cutting block slide separately along the first axis, and an initial distance from the pressing block to an end of the opening is greater than an initial distance from the cutting block to the end of the opening; wherein after the first plier and the second plier are pressed, the first connecting rod is used to make the pressing block slide to clamp and press the housing, and then the second connecting rod is used to slide the cutting block to cut the connection line.

2. The press cutting tool as claimed in claim 1, wherein the first connecting rod comprising a second pivoting portion and a third pivoting portion, and the second connecting rod comprising a fourth pivoting portion and a fifth pivoting portion; wherein the first connecting rod is pivotally connected to the second plier by the second pivoting portion, and pivotally connected to the pressing block by the third pivoting portion; the second connecting rod is pivotally connected to the second plier by the fourth pivoting portion, and pivotally connected to the cutting block by the fifth pivoting portion.

3. The press cutting tool as claimed in claim 2, wherein the first pivoting portion is at one end of the first plier.

4. The press cutting tool as claimed in claim 3, wherein the distance between the second pivoting portion and the first pivoting portion is greater than the distance between the fourth pivoting portion and the first pivoting portion.

5. The press cutting tool as claimed in claim 4, wherein the length of the first connecting rod is greater than the length of the second connecting rod.

6. The press cutting tool as claimed in claim 5, wherein the first pivoting portion is located in a middle of the first plier.

7. The press cutting tool as claimed in claim 6, wherein the distance between the second pivoting portion and the first pivoting portion is less than the distance between the fourth pivoting portion and the first pivoting portion.

8. The press cutting tool as claimed in claim 7, wherein the second connecting rod is curve shaped.

9. The press cutting tool as claimed in claim 2, wherein the first plier further comprising a first sliding hole and a second sliding hole, wherein after the first plier and the second plier are pressed, the third pivoting portion slides within the first sliding hole, and the fourth pivoting portion slides within the second sliding hole.

10. The press cutting tool as claimed in claim 9, wherein the second sliding hole is a curved sliding hole, and after the first plier and the second plier are pressed, the second connecting rod is rotated by sliding the fourth pivoting portion within the second sliding hole.

11. The press cutting tool as claimed in claim 10, wherein after the first plier and the second plier are pressed to cause the pressing block to slide, the fourth pivoting portion pushes the second connecting rod, so as to slide the cutting block.

* * * * *